United States Patent
Sarangarajan et al.

(10) Patent No.: US 7,853,012 B2
(45) Date of Patent: Dec. 14, 2010

(54) AUTHENTICATION SYSTEM EXECUTING AN ELLIPTIC CURVE DIGITAL SIGNATURE CRYPTOGRAPHIC PROCESS

(75) Inventors: Aravamuthan Sarangarajan, Chennai (IN); Thumparthy Viswanatha Rao, Bangalore (IN); Rajiah Murugesh, Tirunelveli (IN); Narasimhachar Srinidhi, Bangalore (IN); Gundeboina Sreenaiah, Secunderabad (IN)

(73) Assignee: Tata Consultancy Services, Ltd., Mumbai (IN)

( * ) Notice: Subject to any disclaimer, the term of this patent is extended or adjusted under 35 U.S.C. 154(b) by 1019 days.

(21) Appl. No.: 11/409,251

(22) Filed: Apr. 21, 2006

(65) Prior Publication Data

US 2006/0285682 A1 Dec. 21, 2006

(30) Foreign Application Priority Data

Jun. 3, 2005 (IN) .................. 664/MUM/2005

(51) Int. Cl.
 *H04L 9/00* (2006.01)
 *H04K 1/00* (2006.01)
(52) U.S. Cl. .................. 380/28; 708/1; 708/8; 708/100; 708/105; 708/131; 708/802; 708/803; 708/845; 380/263; 380/277
(58) Field of Classification Search .................... 380/28
See application file for complete search history.

(56) References Cited

U.S. PATENT DOCUMENTS

2003/0152218 A1* 8/2003 Coron et al. .................. 380/30
2005/0039023 A1* 2/2005 Vanstone et al. ............ 713/180

* cited by examiner

*Primary Examiner*—Taghi T Arani
*Assistant Examiner*—Mahfuzur Rahman
(74) *Attorney, Agent, or Firm*—Charles A. Muserlian (57) ABSTRACT

An authentication system and a method for signing data are disclosed. The system uses a hardware software partitioned approach. In its implementation the system of the invention compares favourably with performance and other parameters with a complete hardware or full software implementation. Particularly, advantageously there is a reduced gate count. Also as disclosed in the invention the system makes it difficult for hackers to attack the system using simple power analysis.

20 Claims, 3 Drawing Sheets

AUTHENTICATION SYSTEM EXECUTING AN ELLIPTIC CURVE DIGITAL SIGNATURE CRYPTOGRAPHIC PROCESS

FIELD OF INVENTION

This invention relates to cryptography.

In particular, this invention relates to secure and efficient generation of digital signatures for the purpose of authentication.

BACKGROUND OF THE INVENTION

Definitions

As used in this specification the following words are generally intended to have a meaning as set forth below, except to the extent that the context in which they are used indicate otherwise.

'Prime number': A positive integer not divisible without a remainder by any positive integer other than itself and one 'Random number': Random numbers are numbers that occur in a sequence such that two conditions are met: (1) the values are uniformly distributed over a defined interval or set, and (2) it is impossible to predict future values based on past or present ones 'Authentication system': A system which identifies a user, typically by having the user enter a valid user name and valid password before access is granted is known as an authentication.

'Cryptography': The practice and study of encryption and decryption by encoding data so that it can only be decoded by specific individuals. Also, the practice and study of undeniably authenticating the sender of a message.

'Cryptographic process': A process for encoding data or authentication is a cryptographic process.

'Digital Signature': A Digital signature is a cryptographic scheme for authenticating digital information implemented using techniques from the field of public-key cryptography.

'Private key': In cryptography, a private or secret key is an encryption/decryption key known only to the party or parties that exchange secret messages.

'Hash function': A hash function is a function for examining the input data and producing an output of a fixed length, called a hash value.

'Modulo/Modulus operation': A modulo operation finds the remainder of division of one number by another.

'Point Multiplication': Multiplication of a point P belonging to an elliptic curve defined over a finite field and forming a group with a positive integer 'k' so as to obtain a new point kP belonging to the same curve is defined as point multiplication.

'Inverse': Inverse of a number x modulo a given number N is defined as that number which when multiplied with x is 1 modulo N.

'Partitioning': The act or process of dividing something into parts in a manner such that each of the divided parts is in some sense independent of each other.

'Logic unit': A unit, which performs logical and other related operations.

INTRODUCTION

Computers have become very important for the implementation of business related functions, which may range from a basic task, such as sending a business letter via electronic mail to processing a business transaction online. The use of Internet for implementation of business related functions is becoming very popular.

Hence companies and individuals desire secure means for communication. All messages exchanged in the process of communication need to satisfy the security attributes of Authentication, Confidentiality, Integrity and Non-repudiation.

If the information being sent is not secured properly the possibility of intruders accessing or forging such information is very likely. Hacking is a term which is associated with such intrusive activity. Hacking allows an individual to exploit the weaknesses and loopholes in security to gain unauthorized access to the information that is being transmitted. A hacker attempts to break into the systems or networks by attacking the weakest and the most vulnerable link. The purpose of hacking may be either for industrial espionage, for fun or may be ideological. Leakage of confidential information due to hacking may cause severe commercial and technological damage. It is important that the security applied to communications be robust against any hacking.

For meeting these security attributes the use of cryptographic techniques was created. Cryptography is a science which deals with linguistic and mathematical techniques for securing information, particularly in communications. Cryptographic techniques make extensive use of mathematics, particularly discrete mathematics, including topics from number theory, information theory, computational complexity, statistics and combinatorics. The information which is to be encrypted is known as plaintext and the encryted data is known as ciphertext. Modern cryptographic techniques provide mechanisms not only for encrypting information but also for authentication, non-repudiation and secure key-exchange.

Various cryptographic techniques exist for achieving the different security attributes. A cryptosystem or a cryptographic system is a package of all procedures, protocols, cryptographic algorithms and instructions used for securing messages through cryptography. Cryptosystems may be broadly classified into two categories:

(i) symmetric key cryptosystems; and
(ii) asymmetric key cryptosystems.

A symmetric key cryptosystem is used for achieving confidentiality of information exchange, i.e., encryption and decryption. In a symmetric key cryptosystem the sender and receiver of a message know and use the same secret key, the sender uses the secret key to encrypt the message, and the receiver uses the same secret key to decrypt the message. As a result anyone who gains access to the key can read, modify, and forge all messages encrypted with that key.

An asymmetric key cryptosystem is used for both confidentiality and authentication. In an asymmetric or a public key cryptosystem each person generates a pair of keys, one called the public key and the other called the private key. The public key is made public, while the private key is kept secret with the individual who generated it. Only the private key can decrypt data that is encrypted with the public key. For achieving confidentiality, the information is encrypted with the public key of the receiver by anyone wishing to communicate with the receiver. The ciphertext so generated can be decrypted only by the receiver, as she alone possesses the private key. For achieving authentication, the sender generates a transformation of a hash of her message, using her private key. This is known as a digital signature. The receiver regenerates the hash from the message and performs an operation on the hash with the digital signature, using the public key of the sender. The result is compared with a part of the digital signature. If there is a match, then it could be inferred that the message has been sent only by the sender who has signed it, as only she has access to the corresponding private key. Thus, authentication is achieved. This process is known as signature verification. The need for the sender and receiver to share secret information is eliminated and the private key is never transmitted or shared.

Digital signatures can also be used to ensure that the original content of the message or document that has been conveyed is unchanged. They also facilitate non-repudiation since only the signer could have generated the signature.

Different public key cryptosystems make use of different types of algorithms. The main difference in the working of the various algorithms is the method used to generate the public and the private key and the mathematics that associate the two keys. For different public key cryptosystems the size of the private and the public key needed to achieve the same level of security is different. Consequently the total time taken by the processor for generation of a digital signature is dependent on the cryptosystem chosen.

The Rivest-Shamir-Adleman (RSA) is one such public key cryptosystem that offers encryption and authentication using digital signatures. The ElGamal cryptosystem also provides a digital signature scheme.

Elliptic Curve Cryptography, hereafter also referred to as ECC, was first proposed independently by Neal Koblitz and Victor Miller in 1985 and later adopted by IEEE for signing and verifying messages. In the Elliptic Curve Digital Signature Algorithm (or ECDSA), the message is first hashed using a standard hashing algorithm such as SHA-1. The hashed message is then transformed into a signature, a pair of bit strings, using the sender's private key. Both the message and the signature are sent to the receiver. The receiver on receiving the message computes the hash and uses sender's public key to verify the digital signature.

The Elliptic curve cryptosystem is a public key cryptosystem, which makes use of elliptic curves. The main benefit of the elliptic curve cryptosystem is that under certain situations it uses smaller keys than other methods while providing an equivalent or higher level of security. The elliptic curve cryptosystem is comparatively more secure than other cryptographic techniques as it is computationally harder to break the algorithm used by it. Breaking ECC requires solving a discrete logarithm problem for the group of the chosen elliptic curve over some finite field.

In Elliptic Curve Cryptography, one starts with a finite field. Informally, a field is a set of elements with an addition and multiplication operation defined on it that satisfies some basic properties. An example is $F_p=\{0, 1 \ldots p-1\}$, the set of integers less than p, where p is a prime number. Addition and multiplication are defined modulo p. Another example is $F_2^m$, the set of all polynomials of degree less than m with coefficients 0 or 1. Addition of polynomials is performed coefficient-wise where the coefficients are added modulo 2. Multiplication is performed modulo m, meaning two polynomials are first multiplied, the result of multiplication is then divided by a reduction polynomial of degree m, and the remainder of the division is the result of the operation.

An elliptic curve over a binary field $F_2^m$ is defined as the set of all points (x, y) with x, $y \in F_2^m$ satisfying $y^2+xy=x^3+ax^2+b$, where a, $b \in F_2^m$. The points on the curve together with a special "point at infinity" (denoted by O) form a group that is denoted as $E(F_2^m)$. To generate a key pair, the public and private keys of a public key cryptosystem, we need a base point $G \in E(F_2^m)$ that generates a subgroup of a large order n (the subgroup generated by G is the largest group within $E(F_2^m)$ containing G). Next we generate a random number d, with d<n, and compute the point Q=d·G (which is the addition operation applied to G, (d−1) times). Then Q is our public key while d is the private key.

The set (m, a, b, G, n) is referred to as the domain parameters of the elliptic curve. It is required that n be a large prime number in order to ensure a cryptographically strong curve. As a result, the underlying field defined by m should be large. It is recommended that m>160.

The standard signature generation algorithm based on ECC is described below, where the symbols G, n, t, d denote the following:
G is the base point of the curve.
n is the order of the base point G.
t is the message.
d is the signer's private key and d<n.
I. Compute the message digest e=SHA-1 (t);
II. Generate a random number k, 0<k<n;
III. Compute the value k·G=(x1, y1). Let r=x1 mod n. If r=0, go to II;
IV. Compute $z1=k^{-1}$ mod n;
V. Compute s=z1(e+dr) mod n. If s=0, go to II; and
VI. Output the signature (r, s).

Performance of any signature algorithm is measured by the time taken to generate and verify a signature. Where performance does not meet the requirements of the application, hardware accelerators are used. While hardware accelerators improve performance, they would add to the gate count of the silicon. Therefore, a tradeoff between performance and gate count is required.

It is also required that crypto algorithms be robust against cryptanalysis. Cryptanalysis is the study of methods for obtaining the meaning of encrypted information, without access to the secret key, which is normally required to do so. The goal of cryptanalysis is to find some weaknesses or insecurity in a cryptographic system to deduce the secret key. Cryptanalytic attacks are broadly classified into two categories:
1. attacks which target the inherent weaknesses in the algorithm or pure attacks; and
2. attacks that target the weakness in implementation of the algorithm or side-channel attacks.

Some examples of the pure attacks are:
known Ciphertext attack, wherein the attacker has access only to a collection of ciphertexts from an encryption algorithm from which plaintext has to be deciphered
known plaintext attack, wherein the attacker has a set of ciphertexts to which he knows the corresponding plaintext, of an encryption algorithm
chosen plaintext/chosen ciphertext attack, wherein the attacker can obtain the ciphertexts/plaintexts corresponding to an arbitrary set of plaintexts/ciphertexts of his choice, from an encryption algorithm.

Some of the known side channel attacks are as follows:
Timing attack, wherein the attacker measures the time taken to perform a cryptographic operation and concludes the nature of the computations performed
Architectural side-effect attacks, wherein the attacker takes advantage of the side-effects of performing a computation on a particular machine architecture to guess the computations performed
Power monitoring attack/power analysis attack, wherein the attacker makes use of varying power consumption by the hardware during different computations
TEMPEST/radiation monitoring attack, wherein the attacker correlates the leaked electromagnetic radiation directly to plaintexts and other information Acoustic cryptanalysis attack, wherein the attacker correlates sound produced during a computation to the step performed.

The power analysis attack is, in particular, relevant to this invention. This attack works on the principle that each processor operation requires a certain amount of power to perform a particular task. The two main types of power analysis attacks are:

(i) Simple power analysis attack: Wherein the attacker directly correlates the power consumed to the instruction performed by the processor; and (ii) Differential power analysis attack: Wherein the attacker uses statistical analysis to extract the hidden information from a larger sample of power traces.

As an example, from an analysis of the power consumed during the execution of a double-and-add algorithm for elliptic curve point multiplication, it may be possible to distinguish between point addition and point doubling thus revealing the bits of the ephemeral key. This information could be used for deducing the private key.

This invention particularly relates to an efficient method for signature generation of an authentication system using ECDSA, which also reduces, if not eliminates, the possibility of simple power analysis attacks.

PRIOR ART

The traditional approaches to implementation of ECDSA have relied on a purely hardware or a purely software implementation. In the first approach, all the ECC algorithms and the big integer arithmetic required for generating a signature are implemented in hardware. This can typically lead to a gate count in the order of 100,000 or more. The timing results for a software approach depend on the processor used. For a Mitsubishi 16 bit 10 MHz processor (M16C), results have been published whereby a signature has been generated in 150 ms over a 160 bit prime field (refer Hasegawa, T., Nakajima, J., and Matsui, M., A Small and Fast Software Implementation of Elliptic Curve Cryptosystems over GF(p) on a 16-Bit Microcomputer, IEEE Trans. Fundamentals, E82-A, 1 (January 1999), 98-106). This implementation uses some pre-computations and a projective co-ordinate system to speed up the algorithm. The best-known implementation of the elliptic curve point multiplication, the computationally expensive step in signature generation, on an 8051 processor takes nearly 2 seconds (see [2]). Also this uses a 134-bit key, which is not considered cryptographically secure.

Patents in this field deal with optimizing the time taken for generating the signature. The point multiplication operation (step III), in particular, is the focus of many works.

U.S. Pat. No. 6,252,959 discloses a method of point multiplier implementation that reduces the number of point doubling operations. The method achieves timing optimization. However, it requires more memory. The scope of this patent is also restricted to optimizing the point multiplication operation. The disclosed method requires a system with a higher memory capacity.

U.S. Pat. No. 6,263,081 discloses a method of implementing point multiplication, step III, in software using certain pre-computations. Although this achieves optimization on the timing of point multiplication, this results in increasing the memory requirement. The scope of this patent is also limited to point multiplication. The disclosed method provides a full software implementation of the point multiplication step and does not use any parallelism.

U.S. Pat. No. 6,279,110 discloses a modified ECDSA algorithm where the inversion operation on step IV is replaced by generating another random number 't' and submitting a triple (s', r, c) as the signature. Here r is as defined earlier; c=k*t mod n and s'=t*(e+d*r) mod n. The original (r, s) pair is recovered by observing that $s=c^{-1}s'$ mod n. This is an optimized way of generating signature on constrained devices such as smart cards where inversion is also considered expensive. The 's' value is recovered either by the terminal connected to the smart card reader or the verifier. However, if the value is recovered by the verifier, then a longer signature is transmitted thus consuming more bandwidth. The disclosed system consumes more communication bandwidth.

U.S. Pat. No. 6,671,709 discloses a hardware multiplier architecture for use in public key cryptosystems. The multiplier cells are used for modular polynomial basis multiplication. The scope of this patent is also restricted only to optimization of the multiplier module, i.e., step III. The invention does not use any parallelism.

U.S. Pat. No. 6,704,870 discloses the use of pre-stored values of 'k' and 'kG' to circumvent the expensive point multiplication step. New signing pairs (k, kG) are created by combining pairs of pre-stored elements. The combination is performed partly on a smart card and partly on the transaction device in such a way that the identity of the signing elements is not revealed. However, this procedure assumes significant computing power as well as availability of the necessary software on the transaction device. Another aspect is that the signature generation time includes the cost of communication between the card and device thereby increasing use of resources. The disclosed method also uses a complete software approach thereby increasing time for signature generation.

U.S. Pat. No. 6,714,648 discloses hardware and software implementation of ECDSA with a 160-bit curve over a prime field using a residual multiplier implemented in hardware. The implementation in hardware has a memory-mapped input/output. It uses pre-computations to help in speeding up the point multiplication algorithm. Further, the field inversion operation is implemented using residual multiplication. The rest of the operations are performed in software. The disclosed method does not use any parallelism.

U.S. Pat. No. 6,738,478 discloses implementation of the point multiplication using Montgomery method in signature generation. It stresses the fact that functional 'double and add' method for point multiplication is susceptible to power analysis attacks. As 'double and add' involves multiply operations which generate unique power profiles, observation of these profiles will lead to sequences of 1's and 0's thus deriving the scalar value k. The disclosed system does not make use of parallel processing thus taking more time for the point multiplication operation.

U.S. Pat. No. 6,751,318 discloses a signature algorithm which is different from ECDSA. The scheme generates two points on an elliptic curve over a prime field that are compared to verify the signature. The scheme provides a method for deducing the value of 'x' coordinate of a sum of two points using only the x-coordinates of the original two points. Resorting to projective coordinates optimizes elliptic addition and doubling operations and eliminates field inversion. The entire algorithm is implemented in software. The work is a scheme to present an efficient way of verifying rather than generating a signature and has no hardware component in its implementation. Full software implementation makes this system slow.

U.S. Pat. No. 6,772,184 discloses a method for efficient field inversion operation. The 160-bit curve is defined over a prime field. This work is more on optimizing the field inversion operation in point multiplication. The scope of optimization for point multiplication is therefore limited.

U.S. Pat. No. 6,782,100 discloses work related to hardware implementation of Step III, point multiplication, on elliptic curves. This has impact on the performance of signature generation algorithm. However, even better performance could be obtained by enhancing the scope of optimization of the algorithm.

United States Patent Application No. 2001004872 discloses an attack based on differential power analysis to recover the private key 'd' during operations of the form dP for varying point P on the elliptic curve. A counter-measure to this attack is also proposed wherein the value dP is computed indirectly through the use of a random number of same magnitude as 'd'. The disclosed device involves serial processing of the steps thus consuming more time.

United States Application No. 200301522188 discloses optimization of the point multiplication step by storing some pre-selected set of pairs $(k_i, P_i)$ where $P_i=k_iG$. These pre-selected pairs are then used to generate a new random pair (k, kG) through the use of the Frobenious operator on a Koblitz curve. The optimization is a reduction in the number of elliptic operations for performing point multiplication. The disclosed system and method does not make use of parallel processing.

United States Patent Application No. 20030194086 discloses a method for strengthening ECDSA against power analysis. The method introduces noise by using random values during the generation of the signature. Specifically, the private key d is split into two parts that are updated during each iteration in such a way that they sum to d. These parts are used instead of d in the computation of the signature. The point multiplication (step III) is also randomized to prevent leakage of the per-message secret k. However the disclosed method does not reduce the gate count.

United States Patent Application No. 20040001590 discloses an implementation of the double and add operation in point multiplier computation. It points out several optimizations in field multiplication, squaring and point additions which are part of the point multiplication operation. The scope of this patent is restricted to optimizing the point multiplication operation.

United States Patent Application No. 20040091105 discloses an apparatus for hyperelliptic curve crypto processing. The entire crypto algorithm is implemented in hardware, which may imply higher area/hardware requirement. Parallelism is used in this implementation between inversion operation in step IV and the point multiplication in step III, in hardware. Complete hardware implementation as disclosed makes the system very complex.

The prior approaches of implementation of ECDSA thus rely on a complete hardware or a complete software approach. The approach based on complete hardware implementation would increase the number of gates utilized consequently increasing the cost of the hardware. The approach based on complete software implementation increases the time required for signature generation. Also, many previous implementations do not exploit parallelism in the algorithm to speed it up.

This invention seeks to overcome the limitations of the prior art.

An object of this invention is to provide a system for secure and efficient generation of digital signatures.

Another object of this invention is to provide a system, which optimizes on both timing as well as gate count.

Another object of this invention is to provide basic security against power analysis attack, typically the simple power analysis attack.

SUMMARY OF THE INVENTION

According to this invention there is provided an authentication system executing an elliptic curve digital signature cryptographic process for signing data using a private key 'd' being randomly selected such that 0<d<n, where n is a large prime number, said process consisting of the following:

step A: performing hash operation on the data to be signed;

step B: generating a random number 'k', 0<k<n;

step C: performing a point multiplication step using 'k' and a base point G(x, y) selected on an elliptic curve satisfying a function of the type $y^2+xy=x^3+ax^2+b$, where a and b are elements of an underlying binary field, optionally using some sub-steps to obtain intermediate results and consolidating said intermediate results to obtain a consolidated point $M(x_1, y_1)$ on the same curve and computing a number 'r' by performing a modulus operation on the co-ordinate '$x_1$';

step D: computing a number 'z1' by performing inverse operation on the random number 'k' obtained from step B followed by a modulus operation;

step E: computing a number 'z2' by performing multiplication operation on 'd' and the number 'z1' obtained from step D, followed by a modulus operation;

step F: computing a number 'z3' by performing multiplication operation on the hash transformed data obtained from step A and the number 'z1' obtained from step D followed by a modulus operation;

step G: computing a number 's' by first performing a multiplication operation on the number z2 and r obtained from Step E and Step C respectively and then performing an additive operation on the product with 'z3' obtained from step F followed by a modulus operation; and step H: sending out a signature (r, s);

said system adapted to be partitioned between a first, second and third processing means for parallely executing at least a portion of some of the steps of said process.

Typically, step A of said process is performed outside the system and the hash transformed data is provided to the system.

Typically, said first processing means is adapted to process at least step B of said process.

Typically, said second processing means has a logic unit and is adapted to process at least a portion of step C of said process.

Typically, said third processing means is adapted to process at least steps D, E, F, G and H of said process and optionally a portion of step C.

Typically, said first processing means is adapted to execute the following steps:

(i) generate a random number; and (ii) send the random number generated to the second and third processing means Typically, said second processing means is adapted to execute the following steps:

(i) receive the random number from the said first processing means;

(ii) receive commands for activating a logic unit (iii) execute at least a portion of the point multiplication step C of said process;

(iv) post the status of execution of the point multiplication step of said process; and (v) send the intermediate result of the point multiplication step to the third processing means; and Typically, said third processing means is adapted to execute the following steps:
(i) receive hash transformed data;
(ii) receive the random number from said first processing means;
(iii) execute the steps D, E and F of said process;
(iv) optionally execute a portion of the step C of said process;
(v) receive the intermediate result of the point multiplication from said second processing means and consolidate the result of step C;
(vi) execute the steps G and H of said process; and
(vii) output said signature of step H.

Typically, said first processing means comprises:
(i) random number generation means, for generating a random number; and
(ii) sender means for sending the random number generated to the second and third processing means.

Typically, said second processing means comprises:
(i) receiver means for receiving the random number generated by the random number generation means;
(ii) logic unit for performing at least a portion of the point multiplication of said process;
(iii) control register means for instructing and activating the logic unit;
(iv) status register means for posting the status of execution of the point multiplication step of said process; and
(v) sender means for sending the intermediate result of the point multiplication step to the third processing means.

Typically, said third processing means comprises:
(i) receiver means for receiving hash transformed data and the intermediate result of the point multiplication from said second processing means;
(ii) computational means for executing the steps D, E and F of said process;
(iii) computational means for optionally executing a portion of step C of the said process and consolidating the final result of step C;
(iv) computational means for executing the steps G and H of said process; and
(v) output means for sending out said signature of step H.

Typically, said first processing means is at least one selected from a group consisting a microprocessor or customized hardware logic.

Typically, said second processing means is a hardware accelerator.

Typically, said third processing means is a microprocessor.

Typically, the first and second processing means are adapted to communicate with the third processing means in a memory mapped format.

Typically, the hardware accelerator is at least one selected from a group of hardware accelerators consisting a programmable hardware accelerator, non programmable hardware accelerator, hardware accelerator card or a hardware accelerator board.

Typically, said second processing means and said third processing means are adapted to execute parallely a portion of step C and steps D, E, F and the remaining portion of step C, respectively.

Typically, said second processing means is adapted to consume power in a manner such that in executing its portion of step C the power is masked by the power consumed by the third processing means in executing steps D, E, F and the remaining portion of step C, respectively.

In accordance with another aspect of this invention there is provided a method for signing data, said method using a process of elliptic curve digital signature cryptography using a private key 'd' being randomly selected such that 0<d<n, where n is a large prime number, said process consisting of the following:

step A: performing hash operation on the data to be signed;
step B: generating a random number 'k', 0<k<n;
step C: performing a point multiplication step on the random number generated from step B and a base point G(x, y) selected on an elliptic curve satisfying a function of the type $y^2+xy=x^3+ax^2+b$, where a and b are elements of an underlying binary field, optionally using some sub-steps to obtain intermediate results and consolidating said intermediate results to obtain a consolidated point $M(x_1, y_1)$ on the same curve and computing a number 'r' by performing modulus operation on the co-ordinate '$x_1$';
step D: computing a number 'z1' by performing inverse operation on the random number 'k' obtained from step B followed by a modulus operation;
step E: computing a number 'z2' by performing multiplication operation on 'd' and the number 'z1' obtained from step D, followed by a modulus operation;
step F: computing a number 'z3' by performing multiplication operation on the hash transformed data obtained from step A and the number 'z1' obtained from step D followed by a modulus operation;
step G: computing a number 's' by first performing a multiplication operation on the number z2 and r obtained from Step E and Step C respectively and then performing an additive operation on the product with 'z3' obtained from step F followed by a modulus operation; and
step H: sending out a signature (r, s);

Said method consisting of the following:
(i) at least executing step B of said process in a first processing means;
(ii) at least executing a portion of step C of said process in a second processing means; and
(iii) at least executing steps D, E, F, G and H of said process and, optionally, a portion of step C, in a third processing means.

Typically, the portion of step C, executed in the second processing means and the steps D, E, F and the remaining portion of step C executed in the third processing means are executed in parallel.

Typically, the power consumed by the second processing means to execute its portion of step C is masked by the power consumed by the third processing means to execute steps D, E, F and the remaining portion of step C.

Typically, the point multiplication step in hardware, a portion of step C, includes field multiplication using at least partial unrolling.

Typically, the partial unrolling is used for increasing the parallelism in the implementation of the point multiplication step, thus obtaining performance gains.

Typically, implemented on smartcards by integrating the method within a system on a chip and embedding the said system in a smartcard.

Typically, implemented on servers by incorporating said method through an add-on card occupying a slot on a system bus.

In accordance with one practical embodiment of the digital signature generation of an authentication system, this invention envisages the use of a microprocessor and a hardware accelerator for the implementation of steps involved in the elliptic curve cryptosystem.

A preferred embodiment of this invention is the use of combination of hardware and software components. The point multiplication step is implemented in hardware while the big-integer arithmetic such as multiplication, inversion and modular reduction are implemented in software. By performing most of the software operations in parallel with the hardware, near equal performance of a full hardware implementation is achieved. The parallelism allows effective reduction of the number of big-integer multiplications and reductions, counted towards the time to compute a signature, from two to one. Thus, the software execution time beyond the execution in hardware is reduced. This enables the total performance to be closer to the performance of a full hardware implementation, but reduces the hardware requirement itself. When a high-end microprocessor is used for the third processing means, it is possible to execute a portion of the point multiplication step on the microprocessor. Here, the overall performance would be even closer to a full hardware implementation. The implementation of some of the components in software allows reduction in gate count.

One preferred embodiment of the hardware component is the use of a hardware accelerator, which helps compute a portion of the point multiplication step involved in the implementation of the elliptic curve digital signature cryptographic process. The remaining steps of the elliptic curve digital signature cryptographic process are executed simultaneously in the microprocessor.

Another preferred embodiment of this invention is that the power consumed by the second processing means is masked by the power consumed by the third processing means in executing the remaining steps of the elliptic curve cryptographic process. Thus the masking of the power related to the point multiplication step helps secure the system from simple power analysis attacks.

BRIEF DESCRIPTION OF THE ACCOMPANYING DRAWINGS

The invention will be described in detail with reference to a preferred embodiment. Reference to this embodiment does not limit the scope of the invention.

In the accompanying drawings.

DETAILED DESCRIPTION OF THE INVENTION

The invention will now be explained with reference to FIGS. 1 to 3 of the accompanying drawings.

Figure 1:
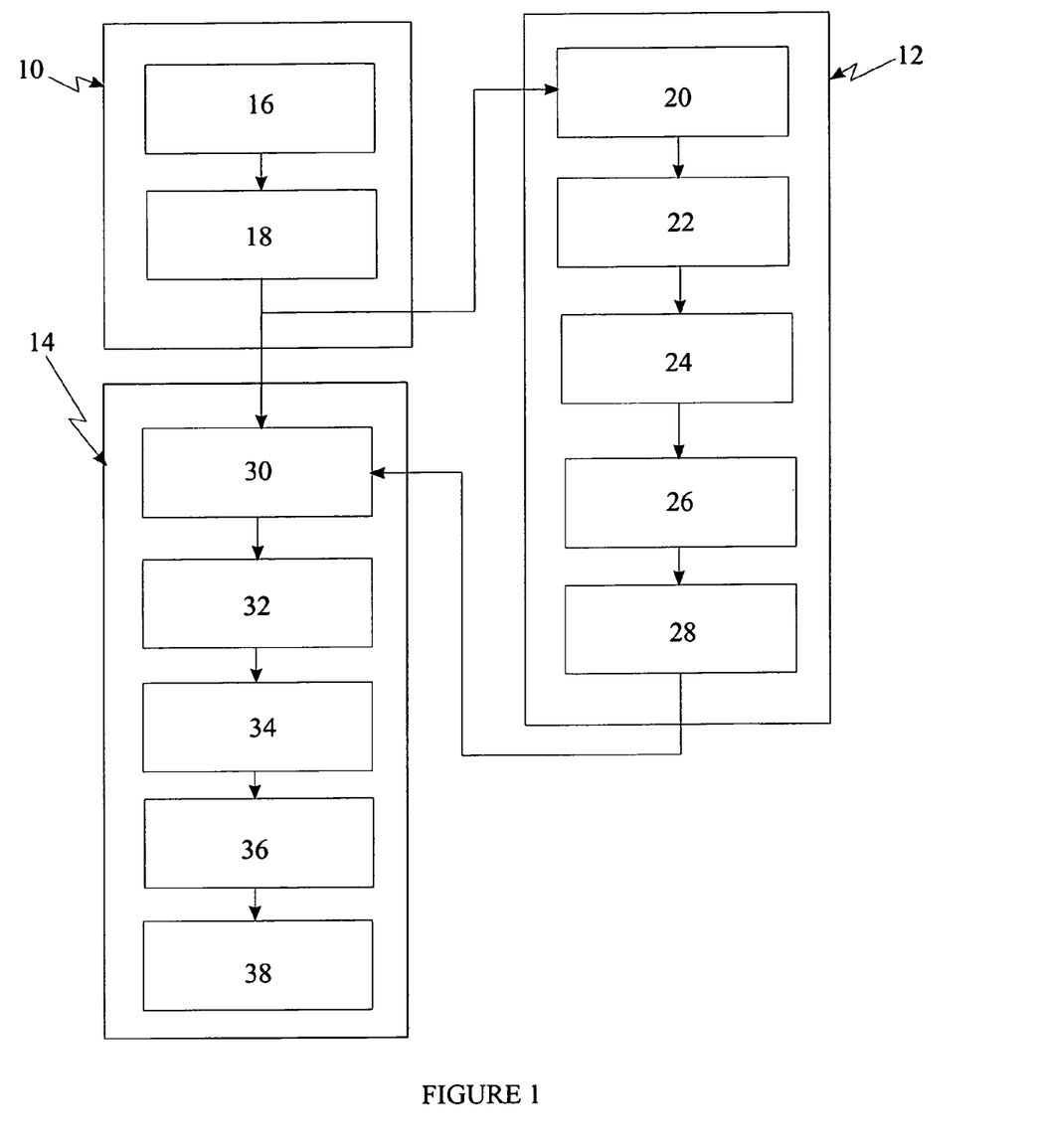
FIG. 1 illustrates the overview of the system used for the implementation of the elliptic curve digital signature cryptographic process.

FIG. 1 illustrates the overview of the system used for implementation of the elliptic curve digital signature cryptographic process. For implementation of the authentication process, a first processing means (10) communicating with a second processing means (12) and a third processing means (14) are used. The first processing means (12) is at least one selected from a group consisting a microprocessor or customized hardware logic. The second processing means (14) is a hardware accelerator. The third processing means (14) is a microprocessor.

The first processing means comprises:
a) random number generation means (16) for generating a random number; and
b) sender means (18) for sending the random number generated to the second and third processing means.

Figure 2:
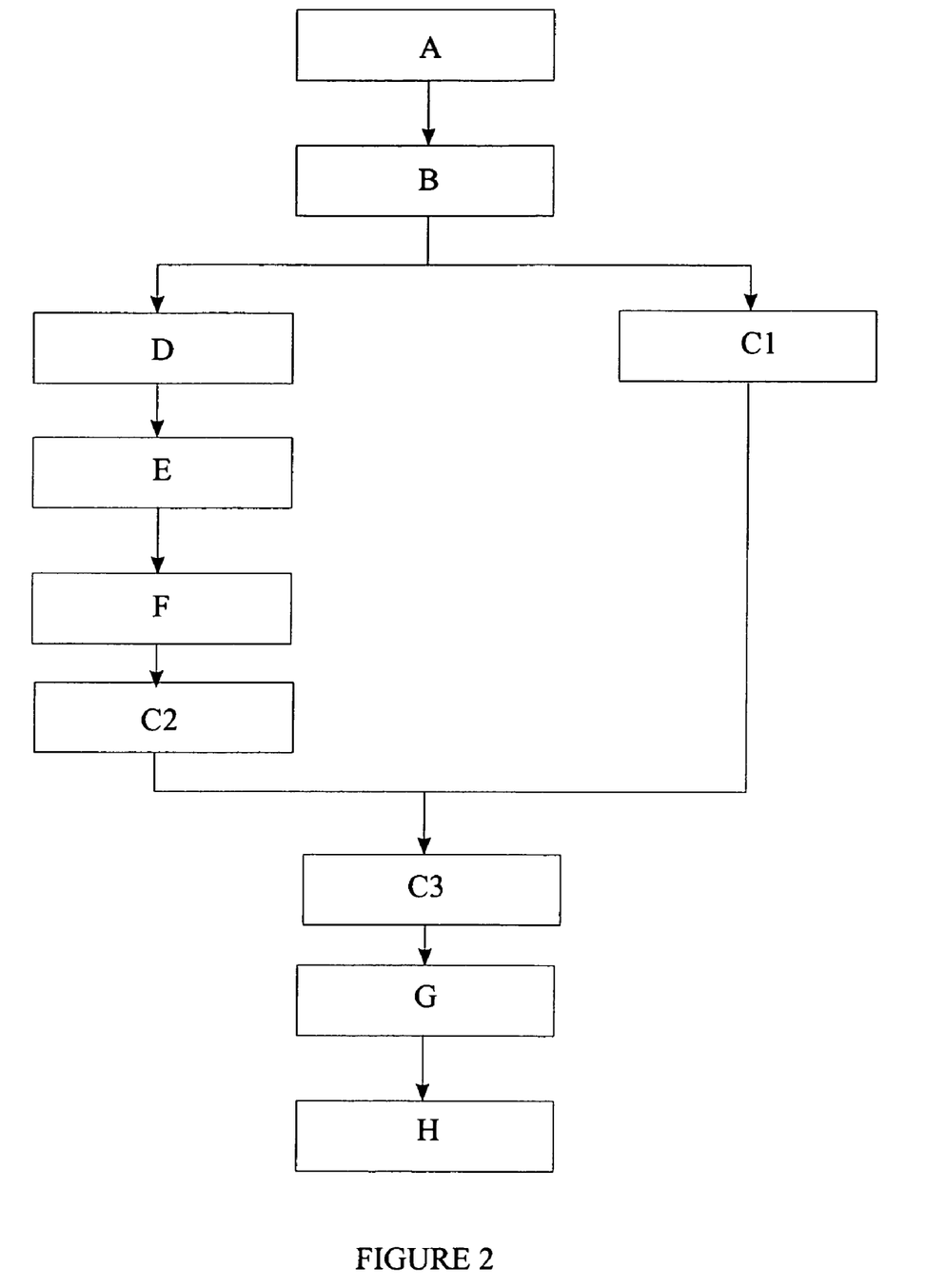
FIG. 2 illustrates a block diagram indicating the steps followed while implementing the elliptic curve digital signature cryptographic process.

The second processing means (12) comprises:
a) receiver means (20) for receiving the random number from the said first processing means;
b) control register means (22) for instructing and activating the logic unit;
c) logic unit (24) for performing at least a portion of step C, step C1 as seen in FIG. 2 of the accompanying drawings, of said process;
d) status register means (26) for posting the status of execution of the point multiplication step of said process; and
e) sender means (28) for sending the intermediate result of the point multiplication step to the third processing means.

The third processing means (16) comprises:
a) receiver means (30) for receiving hash transformed data, the intermediate result of the point multiplication step from said second processing means and the random number from the said first processing means;
b) computational means (32) for executing the steps D, E and F of said process;
c) computational means (34) for optionally executing step C2 as seen in FIG. 2 of the accompanying drawings, of the said process and consolidating the results of step C1 and C2 in step C3 as seen in FIG. 2 of the accompanying drawings;
d) computational means (36) for executing the steps G and H of said process; and
e) output means (38) for sending out said signature of step H.

FIG. 2 illustrates a block diagram indicating the steps followed while implementing an elliptic curve digital signature cryptographic process in accordance with this invention in which each block represents the designated function as mentioned below:

Block A represents the step of executing hash function on data, which is executed outside and provided as input to the system.

Block B represents the step of generating a random number 'k', which is executed in the first processing means.

Blocks C1, C2 and C3 represent the point multiplication step (step C) on the random number generated from step B and a base point G(x, y) selected on an elliptic curve satisfying a function of the type $y^2+xy=x^3+ax^2+b$, where a and b are elements of an underlying binary field, using partitioning to obtain intermediate results and consolidating said intermediate results to obtain a consolidated point $M(x_1, y_1)$ on the same curve and computing a number 'r' by performing a modulus operation on the co-ordinate '$x_1$'. Block C2 could be a null block. Block C3 represents consolidating said intermediate results, when block C2 is non-null. The partitioning of this computation is described later in this section.

Block D represents the step of computing a number 'z1' by performing an inverse operation on the number 'k' obtained from step represented in block B followed by a modulus operation, which is executed in the third processing means.

Block E represents the step of computing a number 'z2' by performing a multiplication operation on the number 'z1' obtained from the step represented in block D and a number 'd' defined as the private key followed by a modulus operation, which is executed in the third processing means.

Block F represents the step of computing a number 'z3' by performing a multiplication operation on the number 'z1' obtained from the step represented in block D and the hash transformed data obtained from the step represented in block A followed by a modulus operation, which is executed in the third processing means.

Block G represents computing a number 's' by first performing a multiplication operation on the number z2 and r obtained from the step represented in block E and the step represented in blocks {C1, C2, C3} respectively and then performing an additive operation on the product with 'z3' obtained from the step represented by block F followed by a modulus operation.

Block H represents the step of outputting the signature (r, s).

Step C can be partitioned. For this, the random number k generated in step B, is rewritten as $$k = k1 + 2^u * k2$$

where k1 is the (u bit) number given by the u least significant bits of k while k2 is the number represented by the remaining bits of k. Then the point multiplication step in step C can be rewritten as $$k \cdot P = k1 \cdot P + k2 \cdot (2^u \cdot P).$$

Let $Q = 2^u \cdot P$ be a point formed by performing point multiplication of P by $2^u$.

Then $k \cdot P = k1 \cdot P + k2 \cdot Q$

Step C is parallelized by computing $k2 \cdot Q$ in the third processing means and $k1 \cdot P$ in the second processing means and finally adding the two points in the third processing means to get k·P. Thus, Step C consists of sub steps C1, C2 and C3, which are Step C1: Compute the value P1=k1·P
Step C2: Compute the value P2=k2·Q
Step C3: Compute k·P=P1+P2

It may be noted that step C2 could be null. This corresponds to the case when k2=0 and the point multiplication is carried out entirely in the second processing means. In this case, step C3 is also null.

Step C1 is executed in block C1. This is executed in the second processing means; steps C2 and C3 are executed in blocks C2 and C3 respectively. These are executed in the third processing means. The steps represented in block C1 and blocks {D, E, F, C2} are executed parallely, thus reducing the overall time as well as cost required for the process of signature generation. The power consumed in executing steps represented by block C1 is masked by the power consumed in executing the steps represented by blocks {D, E, F, C2} thereby making simple power analysis attack difficult.

Figure 3:
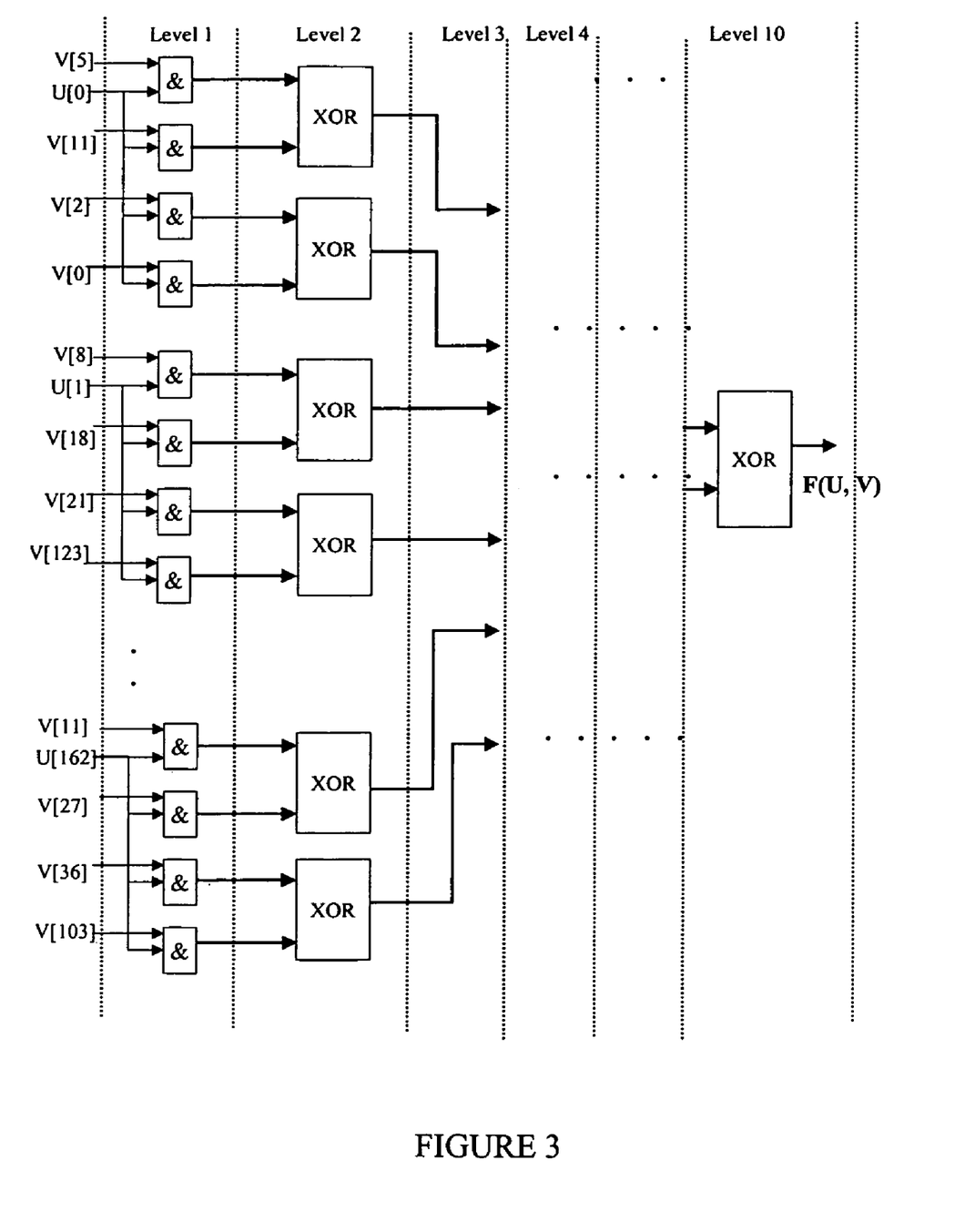
FIG. 3 illustrates a block diagram indicating the step involved in the full unrolling process used for the implementation of the point multiplication step.

FIG. 3 illustrates a block diagram indicating the step involved in the full unrolling process used for the implementation of the point multiplication step. Field multiplication is the most frequently used operation in the implementation of the step represented by block C1 as seen in FIG. 2. It contributes the highest to the timing of this step. This operation is computed as follows. The notation $A(a_0, a_1 \ldots a_{m-1}) \epsilon F_2^m$ indicates that A is a field element with representation $(a_0, a_1 \ldots a_{m-1})$ under a normal basis. Each $a_i$ is 0 or 1.

Let $A(a_0, a_1 \ldots a_{m-1})$ and $B(b_0, b_1, \ldots, b_{m-1}) \epsilon F_2^m$ Then $A*B = C(c_0, c_1, \ldots c_{m-1})$ where each $c_i$ is computed as follows.

Step 1: $U(u_0, u_1, \ldots, u_{m-1}) = A(a_0, a_1, \ldots, a_{m-1})$
Step 2: $V(v_0, v_1, \ldots, v_{m-1}) = B(b_0, b_1, \ldots, b_{m-1})$
Step 3: for k=0 to m−1 do
Step 3.1: $c_k = F(U, V)$
Step 3.2: U=LCS(U) and V=LCS(V)
where LCS is the 'left cyclic shift' operation.
Step 4: return $C = (c_0, c_1, \ldots, c_{m-1})$
Where $$F(U, V) = \bigoplus_{k=1}^{p-2} U_{J(k+1)} V_{J(p-k)}$$

$U_{J(k+1)}$ is $J(k+1)^{th}$ bit of U,
$V_{J(p-k)}$ is $J(p-k)^{th}$ bit of V and $\oplus$ is the x-or operation.

p is computed by the formula p=mT+1, where T is the minimal type of the Gaussian bases for $F_2^m$ and m is the order of the binary field. For m=163, T is 4. Therefore, p=653. J is an array of size (p−1) that is static and could be pre-computed.

The computation of F (U, V) is the innermost loop of point multiplication operation. Thus, this contributes the highest to the timing of the operation. The performance could be improved by fully unrolling the F(U, V) loop. A series of 653 AND gates could be designed with hardwired U and V bits as inputs, as per the lookup table J. The results could be XORed over multiple stages, assuming only a 2-input XOR gate availability. An observation of the F(U, V) computation reveals that each bit of U is ANDed with 4 specific bits of V.

However, the number of gates to implement a full unrolling will be high. Further, the gate delays will limit the number of logic levels that could be completed within a clock cycle and leads to timing violations. Hence, instead of a full unrolling, a partial unrolling is implemented.

As an illustration, the implementation of ECDSA on a 163-bit elliptic curve over a binary field was carried out using an 8051 microprocessor running at 10 Mhz. The hardware logic has been implemented in Xilinx FPGA's executing at 10 MHz. Since the 8051 microprocessor is not powerful enough, step C is not partitioned between the second and third processing means. The result has been tabulated below. The table represents the time taken and the gate count for the various components of the elliptic curve digital signature cryptographic process in accordance with this invention.

| Algorithm | Time (ms) | Gate Count |
|---|---|---|
| Big integer Multiplication (steps E, F and G) | 8.5 | Not Applicable |
| Modular Reduction (steps E, F and G) | 14.5 | Not Applicable |
| Big integer Inversion (step D) | 120 | Not Applicable |
| Elliptic Curve Point Multiplication (step C) | 260 | 39,000 |

The total time taken for signature generation is 283 ms.

Another typical illustration of implementation of the elliptic curve digital signature cryptographic process was tested using an ARM7TDMI microprocessor. For this implementation, two independent platforms have been used—an FPGA platform for the second processing means and an ARM simulator for the third processing means. Since ARM7TDMI is a powerful processor step C has been partitioned between the second and third processing means. The second processing means and third processing means use the double-and-add algorithm for point multiplication. The second processing and third processing means run at a 10 MHz clock. The partition used in this implementation is 123-bits for second processing means and 40 bits for third processing means. This has been arrived at by noting that point multiplication performed in the second processing means is nearly 3 times faster than performing said point multiplication in the third processing means. The result has been tabulated below. The table represents the time taken and the gate count for the various components of the elliptic curve digital signature cryptographic process in accordance with this invention.

| Algorithm | Time (ms) | Gate Count |
|---|---|---|
| Big integer Multiplication (steps E, F and G) | 0.07 | N/A |
| Modular Reduction (steps E, F and G) | 1.75 | N/A |
| Big integer Inversion (step D) | 11.3 | N/A |
| Elliptic Curve Point Multiplication (step C2), 40 bits | 171.2 | N/A |
| Elliptic Curve Point Multiplication (step C1), 123 bits | 180 | 39,000 |

Thus the time for signature generation in this approach is 181.8 ms.

In the present invention a system is disclosed for efficient implementation of ECDSA. The system uses a hardware software partitioned approach rather than complete hardware or full software implementation. In its implementation the system of the invention compares favourably with performance and other parameters with a complete hardware or full software implementation. Particularly, advantageously there is a reduced gate count. Also as disclosed in the invention the system makes it difficult for hackers to attack the system using simple power analysis.

While considerable emphasis has been placed herein on the various components of the preferred system, it will be appreciated that many alterations can be made and that many modifications can be made in the preferred system without departing from the principles of the invention. These and other changes in the preferred system as well as other systems of the invention will be apparent to those skilled in the art from the disclosure herein, whereby it is to be distinctly understood that the foregoing descriptive matter is to be interpreted merely as illustrative of the invention and not as a limitation.

The invention claimed is:

1. An authentication system executing an elliptic curve digital signature cryptographic process for signing data using a private key 'd' being randomly selected such that 0<d<n, where n is a large prime number, said system consisting of a combination of hardware and software components comprising the following:
a first software component adapted to process the following step:
step A: performing hash operation on the data to be signed;
a second software component, adapted to process the following step:
step B: generating a random number 'k', 0<k<n;
a hardware component and a third software component, adapted to, in combination, process the following step:
step C: performing a point multiplication step using 'k' and a base point G(x, y) selected on an elliptic curve satisfying a function of the type $y^2+xy=x^3+ax^2+b$, where a and b are elements of an underlying binary field, using at least one intermediate sub step to obtain intermediate results and consolidating said intermediate results to obtain a consolidated point M(x.sub.1, y.sub.1) on the same curve and computing a number 'r' by performing a modulus operation on the co-ordinate 'x.sub.1'; wherein said hardware component is adapted to perform at least a portion of the point multiplication of step C and said second software component is adapted to receive this intermediate result of point multiplication from said hardware component and is further adapted to consolidate the result of step C;
said third software component means, further being adapted to process the following steps:
step D: computing a number 'z1' by performing inverse operation on the random number 'k' obtained from step B followed by a modulus operation;
step E: computing a number 'z2' by performing multiplication operation on 'd' and the number obtained from step D, followed by a modulus operation;
step F: computing a number 'z3' by performing multiplication operation on the hash transformed data obtained from step A and the number 'z1' obtained from step D followed by a modulus operation;
step G: computing a number 's' by first performing a multiplication operation on the number z2 and r obtained from Step E and Step C respectively and then performing an additive operation on the product with 'z3' obtained from step F followed by a modulus operation; and
step H: sending out a signature (r, s); said system adapted to be partitioned between a first, second and third software component and a hardware component for parallely executing at least a portion of some of the steps of said process;
wherein said second software component, said hardware component, and said third software component are adapted to communicate with each other in a memory mapped format.

2. An authentication system as claimed in claim 1, wherein step A of said process is performed outside the system and the hash transformed data is provided to the system.

3. An authentication system as claimed in claim 1, wherein said hardware component has a logic unit as a hardware accelerator.

4. An authentication system as claimed in claim 1, wherein said second software component is adapted to execute the following steps: (i) generate a random number; and (ii) send the random number generated to the hardware component and third software component, said hardware component is adapted to execute the following steps: (i) receive the random number generated by the random number generation means; (ii) receive commands for activating a logic unit (iii) execute at least a portion of the point multiplication step C of said process; (iv) post the status of execution of the point multiplication step of said process; and (v) send the intermediate result of the point multiplication step to the third software component; and said third software component is adapted to execute the following steps: (i) receive hash transformed data; (ii) receive the random number from said second software component and; (iii) execute the steps D, E and F of said process; (iv) optionally execute a portion of the step C of said process; (v) receive the intermediate result of the point multiplication step from said hardware component and consolidate the result of step C; (vi) execute the steps G and H of said process; and (vii) output said signature of step H.

5. An authentication system as claimed in claim 1, wherein said second software component comprises: (i) random number generation means, for generating a random number; and (ii) sender means for sending the random number generated to the hardware component and said third software component.

6. An authentication system as claimed in claim 1, wherein said hardware component comprises: (i) receiver means for receiving the random number generated by the random number generation means; (ii) logic unit for performing at least a portion of the point multiplication step of said process; (iii) control register means for instructing and activating the logic unit; (iv) status register means for posting the status of execution of the point multiplication step of said process; and (v) sender means for sending the intermediate result of the point multiplication step to the third software component.

7. An authentication system as claimed in claim 1, wherein said third software component comprises: (i) receiver means for receiving hash transformed data and the intermediate result of the point multiplication step from said second processing means; (ii) computational means for executing the steps D, E and F of said process; (iii) computational means for optionally executing a portion of step C of the said process and consolidating the final result of step C; (iv) computational means for executing the steps G and H of said process; and (v) output means for sending out said signature of step H.

8. An authentication system as claimed in claim 1, wherein said second software component is at least one selected from a Group consisting of a microprocessor or customized hardware logic.

9. An authentication system as claimed in claim 1, wherein said hardware component is a hardware accelerator.

10. An authentication system as claimed in claim 1, wherein said third software component is a microprocessor.

11. An authentication system as claimed in claim 9, wherein the hardware accelerator is at least one selected from a group of hardware accelerators consisting a programmable hardware accelerator, non programmable hardware accelerator, hardware accelerator card and a hardware accelerator board.

12. An authentication system as claimed in claim 1, wherein said hardware component and said third p software component are adapted to execute parallely at least a portion of step C and remaining portion of step C, steps D, E and F respectively.

13. An authentication system as claimed in claim 1, wherein said hardware component is adapted to consume power in a manner such that in executing its portion of Step C the power is masked by the power consumed by the third software component in executing its portion of step C, steps D, E and F.

14. A method for signing data, said method using a process of elliptic curve digital signature cryptography using a private key 'd' being randomly selected such that 0<d<n, where n is a large prime number, said process consisting of the following:
employing a first software component to perform the following step: step A: performing hash operation on the data to be signed; employing a second software component to perform the following step:
step B: generating a random number 'k', 0<k<n; employing a hardware component in combination with a third software component to perform the following step:
step C: performing a point multiplication step on the random number generated from step B and a base point G (x, y) selected on an elliptic curve satisfying a function of the type $y^2+xy=x^3+ax^2+b$, where a and b are elements of an underlying binary field, using at least one intermediate sub step to obtain intermediate results and consolidating said intermediate results to obtain a consolidated point M(x.sub.1, y.sub.1) on the same curve and computing a number 'r' by performing modulus operation on the co-ordinate 'x.sub.1';
wherein said hardware component is adapted to perform at least a portion of the point multiplication of step C and said second software component is adapted to receive this intermediate result of point multiplication from said hardware component and is further adapted to consolidate the result of step C;

said third software component means, further being adapted to process the following steps:
step D: computing a number 'z1' by performing inverse operation on the random number 'k' obtained from step B followed by a modulus operation;
step E: computing a number 'z2' by performing multiplication operation on 'd' and the number 'z1' obtained from step D, followed by a modulus operation;
step F: computing a number 'z3' by performing multiplication operation on the hash transformed data obtained from step A and the number 'z1' obtained from step D followed by a modulus operation;
step G: computing a number 's' by first performing a multiplication operation on the number z2 and r obtained from Step E and Step C respectively and then performing an additive operation on the product with 'z3' obtained from step F followed by a modulus operation; and
step H: sending out a signature (r, s); said method consisting of the following: (i) at least executing step B of said process in a second software component; (ii) at least executing a portion of step C of said process in said hardware component; and (iii) at least executing steps D, E, F, G and H of said process and, optionally, a portion of step C in a third software component;
wherein in said second software component, said hardware component, and said third software component are adapted to be partitioned and communicate with each other in a memory mapped format.

15. A method for signing data as claimed in claim 14, wherein the portion of step C executed in the hardware component and the remaining portion of step C, steps D, E and F executed in the third software component are executed in parallel.

16. A method for signing data as claimed in claim 14, wherein the power consumed by the second processing means to execute its portion of step C is masked by the power consumed by the third processing means to execute its portion of step C, steps D, E and F.

17. A method for signing data as claimed in claim 14, wherein the point multiplication step includes field multiplication using at least partial unrolling.

18. A method for signing data as claimed in claim 17, wherein the partial unrolling is used for increasing the parallelism in the implementation of the point multiplication step, thus obtaining performance gains.

19. A method of signing data as claimed in claim 14, implemented on smartcards by integrating the method within a system on a chip and embedding the said system in a smartcard.

20. A method of signing data as claimed in claim 14, implemented on servers by incorporating said method through an add-on card occupying a slot on a system bus.

* * * * *